United States Patent [19]
Schröder et al.

[11] Patent Number: 5,307,192
[45] Date of Patent: Apr. 26, 1994

[54] PROCESS FOR BIDIRECTIONAL TRANSMISSION OF DATA

[75] Inventors: Jürgen Schröder, Springe; Martin Brahms, Hanover; Ziaedin Chahabadi, Bad Münder, all of Fed. Rep. of Germany

[73] Assignee: KE Kommunikations Elektronik GmbH & Co, Hanover, Fed. Rep. of Germany

[21] Appl. No.: 872,515

[22] Filed: Apr. 23, 1992

[30] Foreign Application Priority Data

Apr. 26, 1991 [DE] Fed. Rep. of Germany ....... 4113661

[51] Int. Cl.⁵ .................... H04J 14/08; H04B 10/00
[52] U.S. Cl. ................... 359/135; 359/113; 370/84
[58] Field of Search ............. 359/113, 114, 135, 136, 359/137, 152, 153; 370/101, 103, 84; 375/107, 121

[56] References Cited

U.S. PATENT DOCUMENTS

| 4,606,023 | 8/1986 | Dragoo | 370/103 |
| 4,720,827 | 1/1988 | Kanaji | 370/4 |
| 5,075,791 | 12/1991 | Hastings | 359/135 |
| 5,103,446 | 4/1992 | Fischer | 370/84 |
| 5,111,451 | 3/1992 | Piasecki et al. | 370/103 |
| 5,220,561 | 6/1993 | Nuhn et al. | 370/84 |

OTHER PUBLICATIONS

E. Hölzler H Holzwarth, Pulstechnick, 1984 (provided by applicant).

Primary Examiner—Richard E. Chilcot, Jr.
Assistant Examiner—Rafael Bacares
Attorney, Agent, or Firm—Ware, Fressola, Van Der Sluys & Adolphson

[57] ABSTRACT

A process is indicated for the bidirectional transmission of digital data through a glass fiber, whereby the bits from data to be transmitted are compressed by a factor >2 into bursts, in packages of equal quantities, without changing the transmission rate. The bursts in one direction of the transmission are sent by an emitter station through a glass fiber to the other station, during the pauses between the bursts in the other transmission direction. Independent external pulse generators are used at both ends of a glass fiber to determine the transmission rates of the stations. If the frequencies of the two pulse generators deviate from each other, the bursts of the data flowing at the lower transmission rate are displaced with respect to the bursts of the other flow of data, by the width of one bit of the pertinent continuous flow of data. The displacement of the bursts is communicated to the respective receiver by at least one information bit corresponding to the burst preceding the first burst to be displaced.

6 Claims, 3 Drawing Sheets

PROCESS FOR BIDIRECTIONAL TRANSMISSION OF DATA

TECHNICAL FIELD

The invention relates to transmission of digital information and, more particularly, to transmission over optical or glass fiber.

BACKGROUND OF THE INVENTION

The invention concerns a process for the bidirectional transmission of digital data through glass fibers, with which the data from the emitter in one station are transmitted to the receiver in a station at the other end of the glass fibers, whereby the bits from continuously transmitted data are compressed by a factor >2 in bursts, in packages of equal quantities, without changing the transmission rate, where the bursts in one of the transmission directions are transmitted by the respective emitter through the glass fibers, during the pauses between the bursts in the other transmission direction, and with which the continuous flow of data is recovered from the bursts received by the respective receiver (DE-Book "Pulstechnik", Hölzler & Holzwarth, volume II, published in 1984 by Springer, pages 402 to 412).

The bidirectional transmission of data through glass fibers permits to make better use of existing transmission paths. The transmission of signals by an emitter in a station that is connected to the glass fibers, to the receiver of the opposite station, is only possible without additional measures, when the emitter of the opposite station is not transmitting. The waiting time of the other station is measured as a function of the length of the transmission time of the sending station, during which the waiting station cannot transmit any data. The data flowing to the forcibly passive receiving station must be stored during the receiving operation, which represents a relatively large expense. Furthermore, important communications may be blocked for too long if one of the stations is not able to transmit for a long time. To this must be added that a (digitalized) telephone conversation via such a transmission path is nearly impossible.

This deficiency is corrected by the burst operation according to the DE-Book "Pulstechnik", described above. With this known process, both stations can transmit at the same time and also receive at the same time, if it is assured that the bursts do not collide in the two transmission directions. This is achieved by transmitting the bursts in one transmission direction during pauses between the bursts in the other transmission direction, created by compressing the bits of the continuous flow of data. The transmission rates of the flow of data to be transmitted are determined by pulse generators. To prevent displacements causing collisions between the two opposing flows of data, one of the stations in the known process operates as a "master" station, while the pulse is supplied to the other, the "slave" of the master station. The cost is correspondingly high.

The invention has the task of developing the process described earlier, so that the pulse supply to the two stations can be simplified, and the existing devices and components of the stations can still be utilized.

DISCLOSURE OF THE INVENTION

This task is fulfilled by the invention, in that:

independent, external pulse generators are used to determine the transmission rates in the stations at both ends of the glass fibers;

if the frequencies of both pulse generators deviate from each other, the bursts of the data flowing at the lower transmission rate are displaced with respect to the bursts of the other data, by the width of one bit of the pertinent continuous flow of data, and the displacement of the bursts is communicated to the respective receiver by at least one information bit corresponding to the burst preceding the first burst to be displaced.

With this process, both stations can transmit at the same time and also receive at the same time, if it is assured that the bursts in both transmission directions of the stations do not collide, even if the frequencies of both external pulse generators deviate from each other. Deviations in the respective frequencies produce a change in the transmission rates of both continuous flows of data, and lead to a displacement of the bursts of both opposing transmission directions in relation to each other. To prevent the collisions of the bursts in the emitting and receiving devices, which are caused by this displacement, the process corrects the data flowing at the lower transmission rate, with respect to the other. The correction consists each time in displacing the burst by the width (in time) of a bit from the corresponding continuous flow of data. This bit width corresponds to one pulse cycle of the continuous flow of data, so that the displacement of the bursts does not increase the phase jitter of the received data. The receiver on the opposite side is informed that the burst arriving next has been displaced by the width of one bit, as compared to the preceding one. The information is transmitted with the preceding burst, by at least one bit, which may be contained in the control bits. Thus, the receiver knows that it has to adjust for a burst arriving a little earlier.

This process is easy to realize with few additional components. The assignment of the correction is clear, since it is always the "slower" flow of data that is corrected. It must simply be ensured that only one station is corrected, even if the transmission rates of the two flows of data fluctuate to such a degree, that the normally "slower" flow becomes the "faster" one. This may be triggered by temperature changes for example, which can change the pulse generator frequencies. The process also ensures that the existing devices and components of the stations can still be utilized. This is made possible by the external pulse generator assigned to each station, which determines the transmission rate of the data to be emitted, within the specified limits, independently of the pulse from the other station Finally, both stations can be identical with regard to correction units, since both stations can make a correction. To this must be added that the process only requires a commercial (FIFO) memory, whose maximum storage capacity corresponds to the useful bit rate of the continuous flow of data.

To adjust the transmission rates, an extra bit, which is not read by the receiver, may be added to a defined place inside the data bits of the displacement indicating burst. The defined place is specified before the start of the transmission, and indicated to both the emitters and receivers of both stations, so that the emitters insert the extra bit in the right place, and the receivers recognize it as such in the appropriate place. The bursts are always of the same length, so that the position of additional control and information bits does not change with respect to the starting bit in the corrected burst.

BRIEF DESCRIPTION OF THE DRAWINGS

The following describes a configuration example of the process according to the invention, by means of the drawings in diagram form, where.

BEST MODE FOR CARRYING OUT THE INVENTION

The invention is described for a 2-Mbit system, but it should be understood that the invention is applicable at all possible transmission rates. The conditions for the use of the system are indicated in CCITT recommendation G-703, for example. Accordingly, for example, the transmission rate may fluctuate by ±50 ppm. The applicable limits, for example, are thus 2047.9 kbit/s to 2048.1 kbit/s It is assumed that one of the data streams is transmitted at the exact 2-Mbit system rate, therefore at 2048 kbit/s. The other stream of data flowing in the opposite direction has a lower transmission rate of 2047.9 kbit/s. It is therefore "slower" than the other data.

In both data streams, prior to the emission, an always equal number of bits, for example 2048, is compressed into a burst by a factor greater than "2". The 2048 bits of the continuous flow of data have a time length of 1000 μs. With a compression factor of "4", the time length of the thus produced bursts is therefore 250 μs. This creates a pause with a time length of 750 μs between any two bursts of data.

Figure 2:
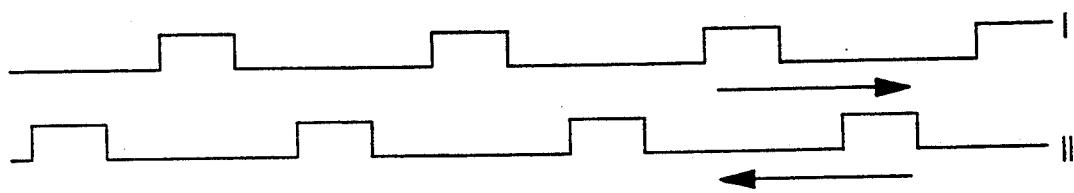
FIG. 2 has data flowing in opposite directions, with data compressed into bursts with data flow II having a lower transmission rate with respect to flow I, which may be adjusted, according to the present invention.

The bursts from the two opposite running streams of data are now transmitted during the pauses between the bursts in the other direction, as shown in principle by FIG. 2. Thus, they reach the receivers of the stations whose emitters are not active. No collisions can therefore take place.

Figure 1:
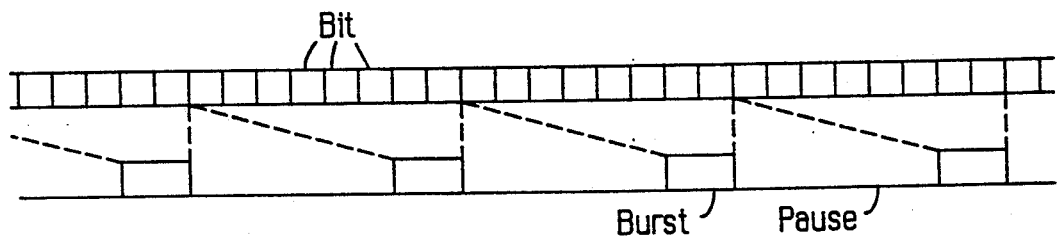
FIG. 1 shows a continuous flow of data with burst produced wherein the flow may be displaced by the width of at least one bit, according to the present invention.

To ensure the above for data flowing at different rates, the bursts of data flow II with the lower transmission rate, thus the slower stream of data, are displaced every 10 ms by the width in time of one bit ($\approx$488 ns) in the transmission direction of the continuous flow of data in FIG. 1. The displacement is realized by using only 2047 bits of the 2048 kbit/s of continuously flowing data for the corresponding burst. Therefore only 2047 bits are read by the data compressor. Accordingly, the burst is therefore transmitted earlier. The displacement required by the lower transmission rate, as compared to the bursts from data flow I, is therefore equalized. With the assumed values, the slower data flow II is corrected after every 10th burst.

To notify the respective receiver, the information that the following burst will arrive earlier in time by the width of one bit, is transmitted with every burst preceding the corrected burst. To that effect, at least one bit of information is inserted into the burst containing the information, preferably in the control bits.

Figure 3:
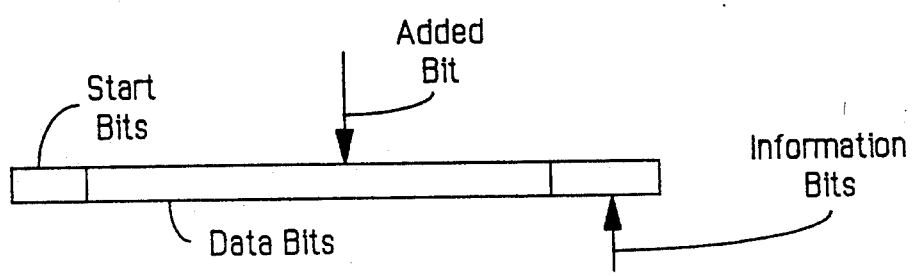
FIG. 3 shows the configuration of a burst which may be used, according to the present invention.

To adjust the transmission rates of both data flows I and II, an extra bit, which is not read by the respective receiver, can be added to the announcing burst of the slower data flow II. Such an extra bit may for example be added to the data bits of the burst, as shown in the burst shown in FIG. 3. In its role of "gap filler", it replaces one of the data bits. The position of the extra bit must be defined. It must be known both in the transmitter and receiver of the stations. The devices are programmed accordingly before the start of the transmission.

The described process can also be used if two or more streams of data are transmitted simultaneously in two directions through one of the glass fibers.

Figure 4:
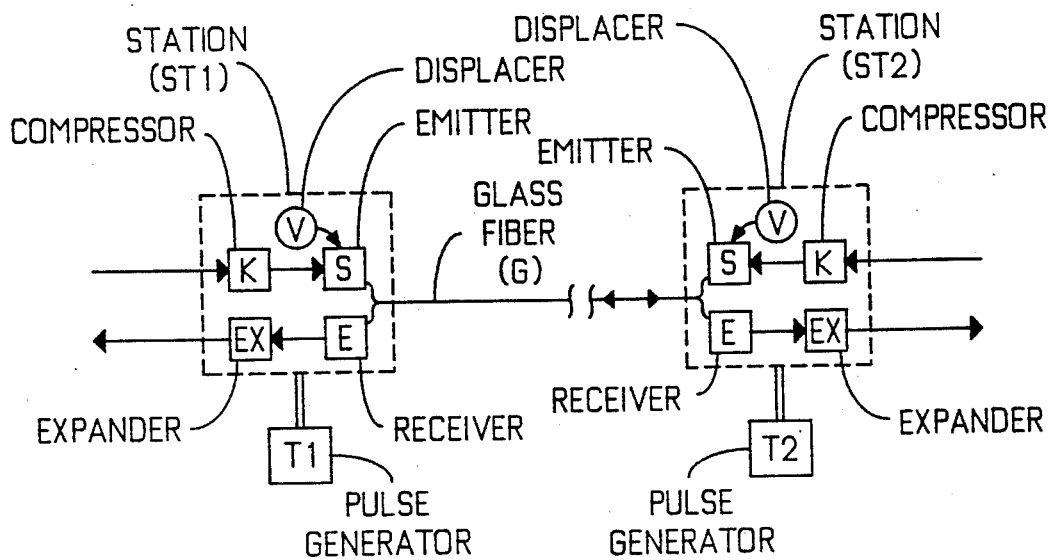
FIG. 4 represents the diagrams of a data transmission path according to the present invention.

FIG. 4 is a simple representation of an example of a transmission path, through which digital data can be transmitted by the process according to the invention. It consists of two stations ST1 and ST2, equipped with independent, external pulse generators T1 or T2, between which a glass fiber G extends. Each station has a compressor K; an emitter S, a receiver E and an expander EX. In addition, each emitter S has a displacer V.

The continuous digital streams of data transmitted by stations ST1 and ST2 are compressed into bursts by compressor K, and supplied by the emitters S to glass fiber G. The bursts are received by receivers E in the respective opposite station, and are converted again into continuous streams of data by expanders EX. The bursts of the "slower" flow of data are displaced by displacer V in the indicated direction. This is accomplished by compressor K by skipping over one bit, to correct the data. It skips from bit 1004 to bit 1006, for example. The bursts of the slower flow of data are sent earlier by the width of one bit, and are processed accordingly on the receiving side.

Any suitable electronic memory may be used as compressor K. For example, it may be a FIFO memory, which reads the data at a pulse rate of 2 Mhz. With a compression factor of "4", the data are read from the memory at a pulse rate of 8 MHz, and then are sent to emitter S.

Expander EX may be the same memory as compressor K. The data coming from receiver E (bursts) are read into the expander EX at the higher pulse rate, and read out at the lower pulse rate.

Figure 5:
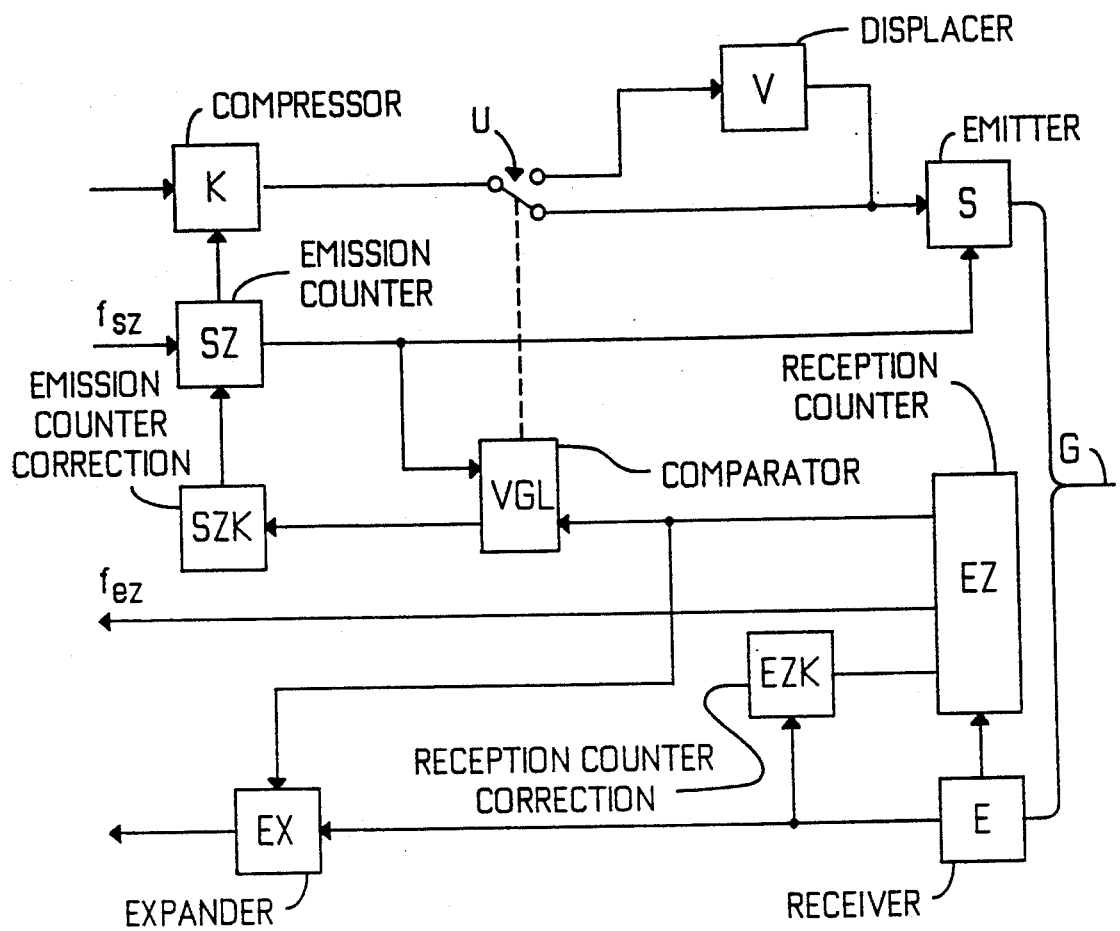
FIG. 5 is one of the stations in the data transmission path of FIG. 4 with additional information, according to the present invention.
Figure 7:
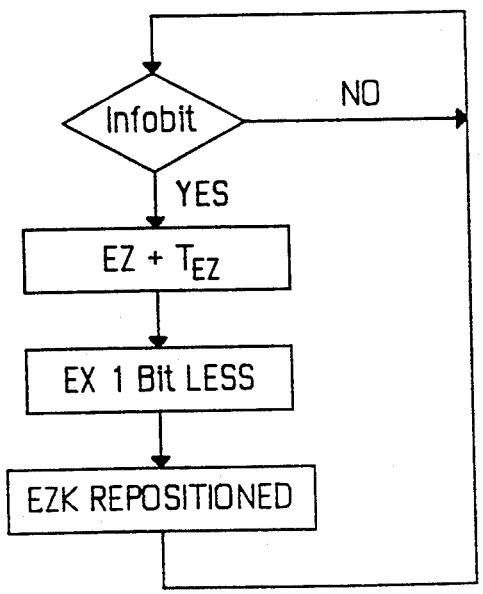
FIGS. 6 and 7 are two flow diagrams according to the present invention.

FIG. 5 shows station ST1 in greater detail. This configuration is also analogous for station ST2. In the following, the process according to the invention is explained in more detail by means of the flow diagrams in FIGS. 6 and 7:

An emission counter SZ and an emission counter correction SZK have been added to compressor K, emitter S and displacer V in the "sending" part of station ST1 in FIG. 5. Analogously, the "receiving part" of station ST1 has a reception counter EZ and a reception counter correction EZK. In addition, a comparator VGL has been drawn in. All the devices and components of station ST1 are controlled in time by the two counters SZ and EZ, serving as main counters. For example, they count 2048 bits in 1 ms for the above explained 2-Mbit system. However, they can also count at a higher velocity.

The continuous stream of data arriving at compressor K is compressed into data consisting of bursts, and is supplied directly to emitter S through the position of switch U drawn in FIG. 5. Comparator VGL constantly compares the frequencies $f_{SZ}$ of the data to be transmitted, and $f_{EZ}$ of the data arriving from the other station.

Figure 6:
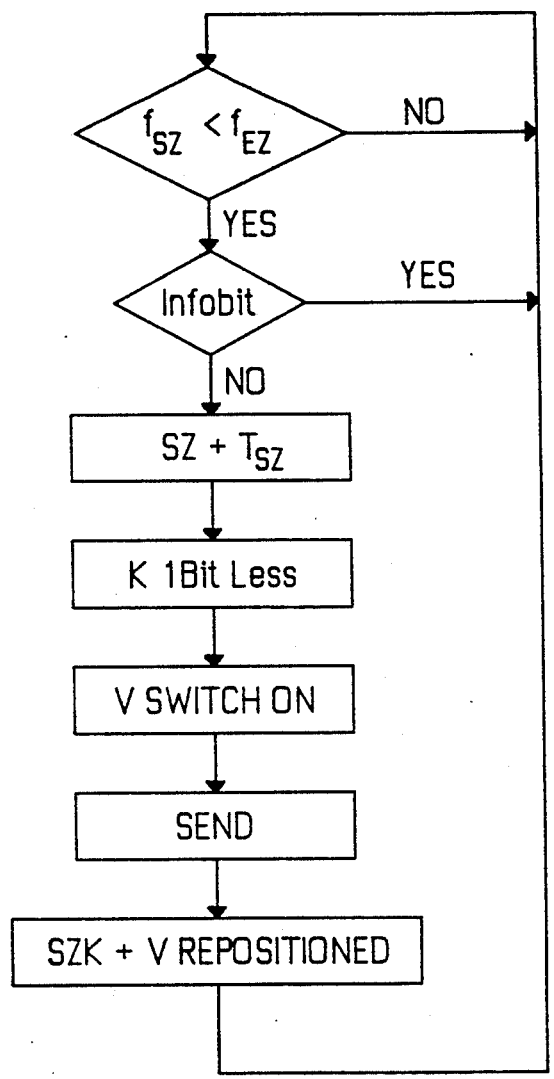

Nothing happens as long as both frequencies are the same, or differ only slightly. If a larger deviation is recorded, for example corresponding to a displacement of the continuous stream of data by the width of one bit, comparator VGL begins to correct the data to be transmitted, if receiver E has simultaneous information that the received data has not been corrected. The correction consists in sending the burst produced by the slower flow of data earlier by the time of one pulse period $T_{SZ}$ of the flow of continuous data (FIG. 6). A correction of the data received in station ST1 could only take place in station ST2, if the data to be transmitted from there is recognized as the slower data. Receiver E of station ST1 would then have received the information bit announcing the correction.

If no such information bit exists, emission counter SZ receives information from emission counter correction SZK, that the data is to be displaced by the width of one bit. The emission counter SZ is then corrected by one pulse period $T_{SZ}$, and compressor K reads one bit less. The thus produced burst is then supplied through switch U, which is activated by comparator VGL, and by displacer V to emitter S, and the transmission is thereby delayed by a pulse period $T_{SZ}$. Subsequently emission counter correction SZK and switch U are repositioned. The following bursts are then transmitted displaced by the time corresponding to one pulse period $T_{SZ}$.

If the slower stream of data is transmitted from station ST2 and received by station ST1, then receiver E receives the information bit (FIG. 7), with which the correction is announced. Receiver counter EZ receives information from receiver counter correction EZK that the received stream of data is displaced by the width of one bit. It is then corrected by one pulse period $T_{EZ}$. $T_{EZ}$ is the pulse period of the continuous flow of data corresponding to the received data. The information that a corrected stream of data is being received, is also sent to comparator VGL and expander EX, which reads one bit less. Subsequently receiver counter correction EZK is repositioned.

We claim:

1. A process for the bidirectional transmission of digital data through a glass fiber, whereby the digital data are transmitted by an emitter of a first station, to a receiver of a second station located at opposite ends of the glass fiber, where the digital data to be transmitted are compressed by a factor greater than two into bursts, where the bursts in one direction of transmission are sent by the emitter of the first station through the glass fiber, during pauses between bursts sent by an emitter of the second station in an opposite direction of transmission, and where continuous streams of data are recovered from the bursts received by the receiver of the second station and a receiver of the first station, wherein:

independent, external first and second pulse generators (T1, T2) are used in the respective first and second stations (ST1, ST2) at the opposite ends of the glass fiber (G), which determine transmission rates of the digital data respective first and second directions, when the frequencies of the first and second pulse generators (T1, T2) deviate from each other, the bursts of the data stream in the first or second direction with a lower transmission rate are displaced, with respect to the bursts of a higher transmission rate data stream in the second or first direction, respectively by a width of one bit of the digital data, and displacement of the bursts is communicated in the first or second direction, respectively, by at least one information bit, to the respective receiver (E) of the second or first station by a burst preceding a first burst to be displaced.

2. A process according to claim 1, wherein the information bit is transmitted with control bits of the data stream.

3. A process according to claim 1, wherein an extra bit is added, in a defined place, to the bust preceding the first burst to be displaced with the lower transmission rate, which is not read by the receiver (E) of the receiving station (ST1, ST2).

4. A process according to claim 3, wherein the extra bit is inserted into the data bits of the stream of data.

5. A process according to claim 2, wherein an extra bit is added, in a defined place, to the burst preceding the first burst to be displaced, which is not read by the receiver (E) of the receiving station (ST1, ST2).

6. A process according to claim 3, wherein the extra bit is inserted into the data bits of the digital data.

* * * * *

UNITED STATES PATENT AND TRADEMARK OFFICE
CERTIFICATE OF CORRECTION

PATENT NO. : 5,307,192

DATED : April 26, 1994

INVENTOR(S) : Schröder et al

It is certified that error appears in the above-identified patent and that said Letters Patent is hereby corrected as shown below:

```
column 6, line 2, please change "the" to --a--; and at line 20, after "data", please insert --in--.
```

Signed and Sealed this

Thirteenth Day of September, 1994

*Attest:*

BRUCE LEHMAN

*Attesting Officer*    *Commissioner of Patents and Trademarks*